(12) United States Patent
Wang (10) Patent No.: US 10,789,468 B2
(45) Date of Patent: Sep. 29, 2020

(54) CONTEXT-BASED AUTONOMOUS PERCEPTION

(71) Applicant: Sikorsky Aircraft Corporation, Stratford, CT (US)

(72) Inventor: Hongcheng Wang, Farmington, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 24 days.

(21) Appl. No.: 15/512,768

(22) PCT Filed: Sep. 16, 2015

(86) PCT No.: PCT/US2015/050393
§ 371 (c)(1),
(2) Date: Mar. 20, 2017

(87) PCT Pub. No.: WO2016/048743
PCT Pub. Date: Mar. 31, 2016

(65) Prior Publication Data
US 2017/0300737 A1  Oct. 19, 2017

Related U.S. Application Data

(60) Provisional application No. 62/053,323, filed on Sep. 22, 2014.

(51) Int. Cl.
*G06K 9/00* (2006.01)
*G06F 16/432* (2019.01)
(Continued)

(52) U.S. Cl.
CPC ......... *G06K 9/0063* (2013.01); *G06F 16/434* (2019.01); *G06K 9/54* (2013.01); *G06K 9/726* (2013.01); *G06T 7/337* (2017.01)

(58) Field of Classification Search
None
See application file for complete search history.

(56) References Cited

U.S. PATENT DOCUMENTS 7,693,624 B2   4/2010  Duggan et al.
8,068,949 B2   11/2011 Duggan et al.
(Continued)

FOREIGN PATENT DOCUMENTS

WO   2010102515 A1   9/2010

OTHER PUBLICATIONS

Yaar Schnitman, Yaron Caspi, Daniel Cohen-Or, and Dani Lischinski, "Inducing Semantic Segmentation from an Example", P.J. Narayanan et al. (Eds.): ACCV 2006, LNCS 3852, pp. 373-384, 2006.*
(Continued)

*Primary Examiner* — Jiangeng Sun
(74) *Attorney, Agent, or Firm* — Cantor Colburn LLP (57) ABSTRACT

A method of performing context-based autonomous perception is provided. The method includes acquiring perception sensor data as an image by an autonomous perception system that includes a processing system coupled to a perception sensor system. Feature extraction is performed on the image by the autonomous perception system. The feature extraction identifies one or more features in the image. Contextual information associated with one or more conditions present upon acquiring the perception sensor data is determined. One or more labeled reference images are retrieved from at least one of a contextually-indexed database based on the contextual information, a feature-indexed database based on at least one of the features extracted, and a combined contextually- and feature-indexed database. The image is parsed, and one or more semantic labels are transferred from the one or more labeled reference images to form a semantically labeled version of the image.

13 Claims, 4 Drawing Sheets

(51) Int. Cl.
*G06K 9/72* (2006.01)
*G06T 7/33* (2017.01)
*G06K 9/54* (2006.01)

(56) References Cited

U.S. PATENT DOCUMENTS

| | | | |
|---|---|---|---|
| 8,068,950 | B2 | 11/2011 | Duggan et al. |
| 8,082,074 | B2 | 12/2011 | Duggan et al. |
| 8,103,398 | B2 | 1/2012 | Duggan et al. |
| 8,355,834 | B2 | 1/2013 | Duggan et al. |
| 8,594,932 | B2 | 11/2013 | McLver et al. |
| 8,600,589 | B2 | 12/2013 | Mendez-Rodriguez et al. |
| 9,019,358 | B2* | 4/2015 | Mestha ............... G06K 9/0063 348/61 |
| 9,177,481 | B2 | 11/2015 | Wang et al. |
| 2006/0143176 | A1 | 6/2006 | Mojsilovic et al. |
| 2006/0167599 | A1 | 7/2006 | Bodin et al. |
| 2009/0083010 | A1 | 3/2009 | Qi et al. |
| 2012/0148162 | A1* | 6/2012 | Zhang ....................... G06T 7/11 382/195 |
| 2012/0243739 | A1* | 9/2012 | Fukuchi ............. G06K 9/00671 382/103 |
| 2013/0080359 | A1* | 3/2013 | Will ....................... B60W 40/06 706/12 |
| 2013/0156305 | A1* | 6/2013 | Prasad ..................... G06K 9/34 382/164 |
| 2013/0198197 | A1* | 8/2013 | Sawhney ............ G06F 17/2785 707/741 |
| 2013/0198601 | A1* | 8/2013 | Makadia ........... G06F 17/30265 715/231 |
| 2014/0133759 | A1 | 5/2014 | Yang et al. |
| 2014/0161362 | A1 | 6/2014 | Liangliang et al. |
| 2014/0240469 | A1* | 8/2014 | Lee ..................... H04N 13/025 348/48 |

OTHER PUBLICATIONS

C. Liu, J. Yuen, and A. Torralba, "Nonparametric Scene Parsing: Label Transfer via Dense Scene Alignment," Proc. IEEE Conf. Computer Vision and Pattern Recognition, 2009, 8 pages.

ISR/WO, Issued Dec. 28, 2015, PCT Application No. PCT/US15/50393, 19 pages.

Oliva, et al.; "Modeiing the Shape of the Scene: A Holistic Representatino of the Spatial Envelope"; Internet Citation, May 2001; URL: http://springerlink.com/content/k62tg81w8352g71h/fulltext.pdf.; 31 pages.

Scherer, et al.; "Autonomous landing at umnprepare sites by a full-scale helpicopter"; Mar. 23, 2012; journal homepage; www.elsevier.com.; 18 pages.

Search Report dated May 3, 2018 for EP 15845132.8.

Singh, et al.; "Nonparametric Scene Parsing with Adaptive Feature RElevance and Semantic Context"; IEE Computer Society Conf. on COmputer Vision/Patter Recognition, US, Jun. 23, 2013; pp. 3151-3157; 7 pages total.

Yu, et al.; "Leveraging Probabilistic Season and Location Context Models for Scene Understanding"; PROc. of the ACM International Conference on Image and Video Retrieval, Niagra Falls, CN, Jul. 7, 2008; pp. 169-178, 10 pages total.

* cited by examiner

CONTEXT-BASED AUTONOMOUS PERCEPTION

This application is a National Phase Application of Patent Application PCT/US15/50393 filed on Sep. 16, 2015, which claims the benefit of and priority to U.S. Provisional Patent Application Ser. No. 62/053,323 filed on Sep. 22, 2014. The entire contents of PCT Application No. PCT/US15/50393 and U.S. provisional patent application Ser. No. 62/053,323 are incorporated herein by reference.

BACKGROUND OF THE INVENTION

The subject matter disclosed herein generally relates to autonomous vehicles, and more particularly to context-based perception for autonomous vehicles.

Optionally-piloted vehicles (OPVs) and unmanned aerial vehicles (UAVs) can operate without a human pilot using autonomous controls. As OPVs and UAVs become more prevalent, they are being operated in less restricted and controlled areas. When OPVs and UAVs are operated autonomously in flight, they must identify a landing zone prior to landing. OPVs and UAVs typically use a model-based classifier system to identify terrain features in image data that may impede a safe landing. While model-based classifiers can be effective when trained with a well-labeled and robust data set, they are not typically adaptive when encountering large degrees of variation. Terrain data may show large degrees of variation based on a number of factors, such as seasonal variations, weather conditions, location, time of day, and the like. As new images are incorporated to identify both different terrain types and terrain conditions, model-based classifiers must be retrained. The retraining process can be time consuming and demands a large amount of processing resources.

Thus, while a model-based classifier can be effective in identifying and labeling observed features in image data when dealing with a limited set of known features under nominal conditions, a model-based classifier may not be sufficiently robust to handle a wide range of variability. Scalability of adding new training data for a model-based classifier can also be challenging due to repeated retraining as new training data sets are incorporated.

BRIEF DESCRIPTION OF THE INVENTION

According to an aspect of the invention, a method of performing context-based autonomous perception is provided. The method includes acquiring perception sensor data as an image by an autonomous perception system. The autonomous perception system includes a processing system coupled to a perception sensor system. Feature extraction is performed on the image by the autonomous perception system. The feature extraction identifies one or more features in the image. Contextual information associated with one or more conditions present upon acquiring the perception sensor data is determined. One or more labeled reference images are retrieved from at least one of a contextually-indexed database based on the contextual information, a feature-indexed database based on at least one of the one or more features extracted from the image, and a combined contextually- and feature-indexed database. The image is parsed, and one or more semantic labels are transferred from the one or more labeled reference images to the image to form a semantically labeled version of the image.

In addition to one or more of the features described above or below, or as an alternative, further embodiments could include acquiring a three-dimensional point cloud and performing three-dimensional feature extraction on the three-dimensional point cloud in parallel with the feature extraction on the two-dimensional visual image. The one or more labeled reference images can be retrieved as a combination of semantically labelled two-dimensional and three-dimensional reference images for label transferring.

In addition to one or more of the features described above or below, or as an alternative, further embodiments could include where the contextual information is extracted from metadata of the image.

In addition to one or more of the features described above or below, or as an alternative, further embodiments could include where the contextual information is received at the autonomous perception system from one or more of: a navigation system, a communication link, and an input/output device.

In addition to one or more of the features described above or below, or as an alternative, further embodiments could include where the contextual information is determined based on observing a test image by the autonomous perception system and comparing the test image to a plurality of reference images having different context values in the contextually-indexed database to identify the contextual information based on one or more best matches between the test image and one of the reference images.

In addition to one or more of the features described above or below, or as an alternative, further embodiments could include where a highest level of similarity is determined based on comparing the one or more features extracted from the image to a plurality of labeled reference images in the contextually-indexed database having a contextual index value matching the contextual information and ranking results of the comparing.

In addition to one or more of the features described above or below, or as an alternative, further embodiments could include where the one or more labeled reference images each comprise a scene that includes multiple semantic labels that identify segments in the scene by semantic type.

In addition to one or more of the features described above or below, or as an alternative, further embodiments could include where indexing of the contextually-indexed database defines a plurality of contexts including a season, a time of day, a weather condition, and a geographic location.

In addition to one or more of the features described above or below, or as an alternative, further embodiments could include where the perception sensor system includes one or more of: a LIght Detection and Ranging scanners (LIDAR) scanner, a video camera, a multi-spectral camera, a stereo camera system, a structure light-based 3D/depth sensor, a time-of-flight camera, a LAser Detection and Ranging scanners (LADAR) scanner, and a RAdio Detection And Ranging (RADAR) scanner.

In addition to one or more of the features described above or below, or as an alternative, further embodiments could include where the autonomous perception system is incorporated in an autonomous vehicle, and the semantically labeled version of the image identifies terrain conditions for guiding the autonomous vehicle.

According to further aspects of the invention, an autonomous perception system is provided. The autonomous perception system includes a perception sensor system and a processing system coupled to the perception sensor system. The processing system includes a processor and memory having instructions stored thereon that, when executed by the processor, cause the autonomous perception system to acquire perception sensor data as an image from the perception sensor system. Feature extraction is performed on the image to identify one or more features in the image. Contextual information associated with one or more conditions present upon acquiring the perception sensor data is determined. One or more labeled reference images are retrieved from a contextually-indexed database based on the contextual information and having a highest level of similarity with at least one of the one or more features extracted from the image. The image is parsed, and one or more semantic labels are transferred from the one or more labeled reference images to the image to form a semantically labeled version of the image.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

In exemplary embodiments, context-based autonomous perception is provided for an autonomous vehicle, such as an aircraft. In an aircraft, the context-based autonomous perception may operate in conjunction with a landing zone classification system to increase the probability of selecting a safe landing zone based on semantically labeled images determined under a wide range of operating conditions. Rather than relying upon a model-based classifier that requires retraining as new datasets are added, embodiments access a contextually-indexed database of labeled reference images to perform matching against acquired images. A variety of terrain semantics, such as water, road, grass, trees, buildings, etc. can be labeled in the reference images as captured under different data acquisition conditions. For instance, a similar location may be photographed during different seasons of the year, at different times of day, and under different weather conditions to provide a range of similar reference images to use for matching and semantic labelling. The labeled reference images can also be indexed by different geographic locations. Thus, autonomous perception can be scaled and made more robust to handle an increased volume of new datasets. Furthermore, context-based indexing reduces the need to search through all images to find a match, as contextual information can filter and constrain a search set before performing more detailed feature comparisons.

Embodiments may be implemented in autonomous aircraft, such as optionally-piloted vehicles (OPVs) and unmanned aerial vehicles (UAVs), and/or may be provided to assist in human-piloted aircraft landing zone selection. Embodiments can also be used in a number of land, water, or air-based autonomy applications, such as vehicle guidance and target recognition.

Figure 1:
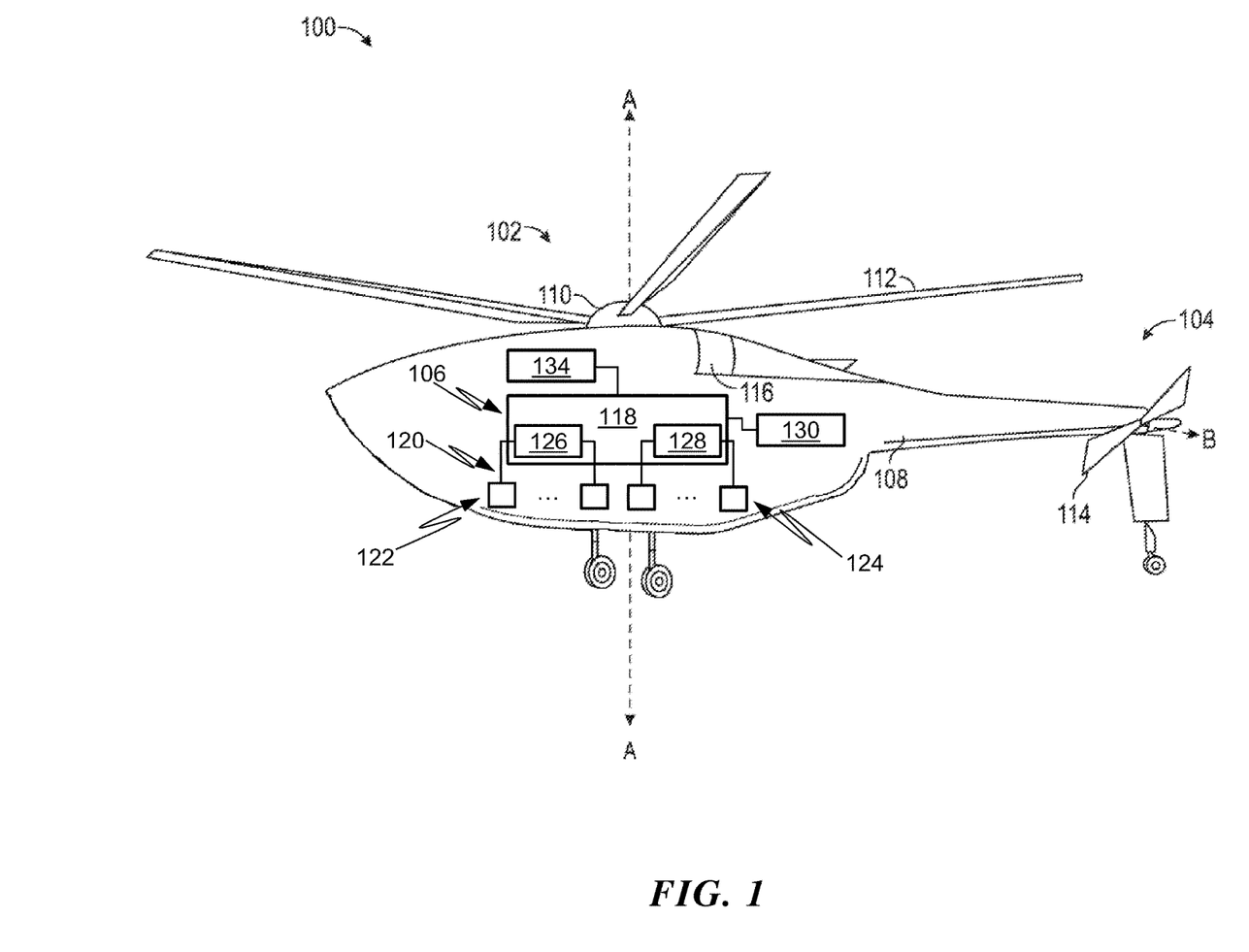
FIG. 1 is a perspective view of an exemplary rotary wing UAV aircraft according to an embodiment of the invention.

Referring now to the drawings, FIG. 1 illustrates a perspective view of an exemplary vehicle in the form of an autonomous rotary-wing unmanned aerial vehicle (UAV) 100 (also referred to as "autonomous UAV 100" or "aircraft 100") for implementing context-based autonomous perception according to an embodiment of the invention. As illustrated, the autonomous UAV 100 is an aircraft that includes a main rotor system 102, an anti-torque system, for example, a tail rotor system 104, and an autonomous perception system 106. The main rotor system 102 is attached to an airframe 108 and includes a rotor hub 110 having a plurality of blades 112 that rotate about axis A. Also, the tail rotor system 104 is attached aft of the main rotor system 102 and includes a plurality of blades 114 that rotate about axis B (which is orthogonal to axis A). The main rotor system 102 and the tail rotor system 104 are driven to rotate about their respective axes A, B by one or more turbine engines 116 through gearboxes (not shown). Although a particular configuration of an autonomous UAV 100 is illustrated as a rotary wing UAV and described in the disclosed embodiments, it will be appreciated that other configurations and/or machines include autonomous, semi-autonomous, and human-controlled vehicles that may operate in land or water including fixed-wing aircraft, rotary-wing aircraft, marine vessels (e.g., submarines, ships, etc.), and land vehicles (e.g., trucks, cars, etc.) may also benefit from embodiments disclosed.

The autonomous perception system 106 includes a processing system 118 having one or more processors and memory to process sensor data acquired from a perception sensor system 120. The perception sensor system 120 may be attached to or incorporated within the airframe 108. The perception sensor system 120 includes one or more three-dimensional imaging sensors 122 and one or more two-dimensional imaging sensors 124. The processing system 118 processes, in one non-limiting embodiment, perception sensor data acquired through the perception sensor system 120 while the autonomous UAV 100 is airborne. A three-dimensional image processing system 126 interfaces with the three-dimensional imaging sensors 122, while a two-dimensional image processing system 128 interfaces with the two-dimensional imaging sensors 124. The three-dimensional image processing system 126 and the two-dimensional image processing system 128 may be incorporated within the processing system 118 or implemented as one or more separate processing systems that are in communication with the processing system 118 as part of the autonomous perception system 106. The three-dimensional imaging sensors 122 can include but are not limited to one or more of: a LIght Detection and Ranging scanners (LIDAR) scanner, a stereo camera system, a structure light-based 3D/depth sensor, a time-of-flight camera, a LAser Detection and Ranging scanners (LADAR) scanner, and a RAdio Detection And Ranging (RADAR) scanner. The two-dimensional imaging sensors 124 may include one or more of: a video camera, a multi-spectral camera, or the like.

The autonomous UAV 100 may include a communication link 130 that is operable to receive data from a remote source, such as a ground station, another vehicle, a satellite, or other wireless transmitter. In one embodiment, the communication link 130 enables the autonomous UAV 100 to receive data that it may not otherwise be capable of directly sensing, such as current weather conditions. Data can be provided on the communication link 130 as requested by the processing system 118 or data can be pushed from a remote source as it becomes available absent a specific request from the processing system 118.

Additionally, the autonomous UAV 100 may include a navigation system 134, such as, for example, an inertial measurement unit (IMU) that may be used to acquire positional data related to a current rotation and acceleration of the autonomous UAV 100 in order to determine a geographic location of autonomous UAV 100, including a change in position of the autonomous UAV 100, or a location against a given map. The navigation system 134 can also or alternatively include a global positioning system (GPS) or the like to enhance location awareness of the autonomous UAV 100.

In exemplary embodiments, the processing system 118 of the autonomous perception system 106 uses the perception sensor system 120 to classify potential landing zones and assist in other guidance algorithms. Contextual information captured from metadata of images acquired by the perception sensor system 120, location information determined by the navigation system 134, time of day and season of the year information known by the processing system 118, and/or weather conditions received via the communication link 130 can be used to select and retrieve similar labeled reference images as part of a semantic classification process. Contextual information can alternatively be determined by other methods as further described herein. By using labeled reference images acquired with similar context, the accuracy of terrain classification can be improved, particularly when operating in a wide range of environmental conditions. For example, tree images in the New England area in the winter may be difficult to when using a simple trained model-based classifier using the images acquired in the summer.

Figure 2:
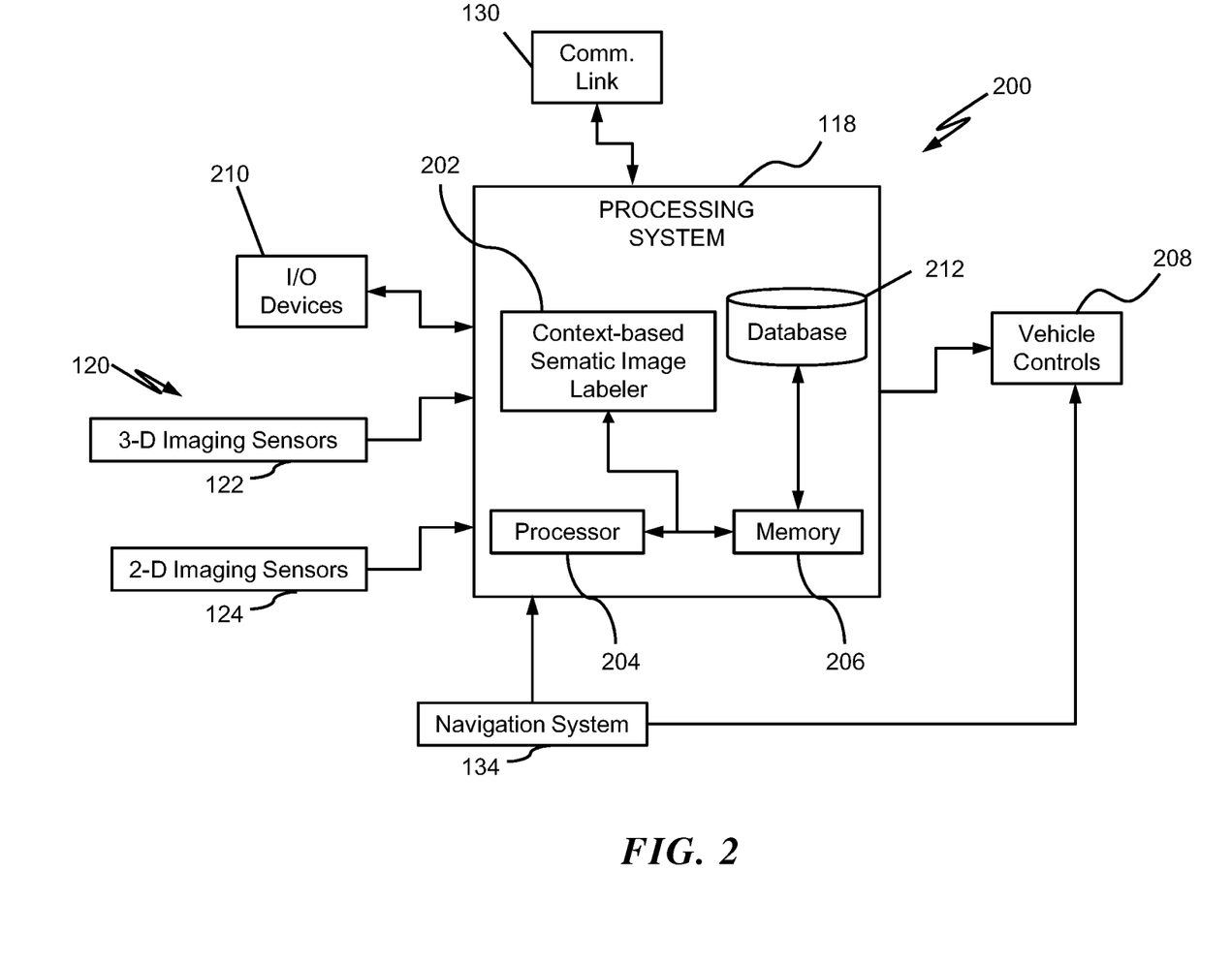
FIG. 2 is a schematic view of an exemplary computing system according to an embodiment of the invention.

FIG. 2 illustrates a schematic block diagram of a system 200 for context-based autonomous perception onboard the autonomous UAV 100 of FIG. 1 according to an exemplary embodiment. The system 200 is an embodiment of the autonomous perception system 106 of FIG. 1. As illustrated, the system 200 includes the processing system 118 as an example of an aircraft computer system that executes instructions for implementing a context-based semantic image labeler 202. The processing system 118 may be coupled to the perception sensor system 120 and receives raw sensor data from the perception sensor system 120. As described in reference to FIG. 1, the perception sensor system 120 can include one or more three-dimensional imaging sensors 122 and one or more two-dimensional imaging sensors 124. As depicted in FIG. 2, the processing system 118 includes a memory 206 that communicates with a processor 204. The memory 206 may store the context-based semantic image labeler 202 as executable instructions that are executed by processor 204. The memory 206 is an example of a non-transitory computer readable storage medium tangibly embodied in the processing system 118 including executable instructions stored therein, for instance, as firmware. Also, in embodiments, memory 206 may include random access memory (RAM), read-only memory (ROM), or other electronic, optical, magnetic or any other computer readable medium onto which instructions and data are stored. The processor 204 may be any type of processor, including a general purpose processor, a graphics processing unit (GPU), a digital signal processor, a microcontroller, an application specific integrated circuit, a field programmable gate array, or the like. Although depicted as singular blocks, the processor 204 and memory 206 can be distributed between multiple processing circuits and memory subsystems. In an embodiment, the processor 204 performs functions of the three-dimensional image processing system 126 (FIG. 1) and the two-dimensional image processing system 128 (FIG. 1).

The system 200 includes a database 212. The database 212 may be used to store labeled reference images to support context-based autonomous perception. Image data stored in the database 212 can include two-dimensional and/or three-dimensional reference images with semantic labels applied to identify terrain type and various features as observed under different sets of conditions. Images in the database 212 can be specific to a single entity type, such as a car, truck, tree, etc. Alternatively, individual images in the database 212 can be a scene that includes multiple semantic labels that identify segments in the scene by semantic type, such as a cityscape with roads, buildings, and vehicles. The database 212 may be populated as a ground-based operation on the processing system 118. Alternatively, data can be added to the database 212 via the communication link 130. Labeling of reference image data may be performed as an offline task. As additional perception sensor data are received from the perception sensor system 120, this data may also be stored in the processing system 118 or transmitted on the communication link 130 for analysis, labeling, and subsequent addition to the database 212.

The system 200 may provide one or more controls, such as vehicle controls 208. The vehicle controls 208 may provide directives based on, e.g., data associated with the navigation system 134. Directives provided by the vehicle controls 208 may include navigating or repositioning the autonomous UAV 100 to an alternate landing zone for evaluation as a suitable landing zone. The directives may be presented on one or more input/output (I/O) devices 210. The I/O devices 210 may include a display device or screen, audio speakers, a graphical user interface (GUI), etc. In some embodiments, the I/O devices 210 may be used to enter or adjust contextual information while the processing system 118 acquires perception sensor data from the perception sensor system 120. It is to be appreciated that the system 200 is illustrative. In some embodiments, additional components or entities not shown in FIG. 2 may be included. In some embodiments, one or more of the components or entities may be optional. In some embodiments, the components or entities of the system 200 may be arranged or configured differently from what is shown in FIG. 2. For example, in some embodiments the I/O device(s) 210 may be commanded by vehicle controls 208, as opposed to being commanded by the processor 204.

The database 212 of FIG. 2 can be indexed based on context information, one or more extracted features from images, or a combination of context information and one or more extracted features from images. As such, the database 212 may be implemented as contextually-indexed database based on contextual information, a feature-indexed database based on features, or a combined contextually- and feature-indexed database. State-of-the-art indexing methods, such as Tree-Based Structure (e.g., KD-Tree), Hashing, or Binary Small Code, are applied to perform large scale and efficient nearest neighbor searches of similar images. Tree-based structure exploits spatial partitions (i.e., KD-tree) and recursive hyper plane decomposition, and provides an efficient means to search low-dimensional vector data exactly. Hashing (e.g., Locality-sensitive hashing) offers sub-linear time search by hashing highly similar examples together. Compact binary code provides a very compact representation with a few hundred bits per image.

Figure 3:
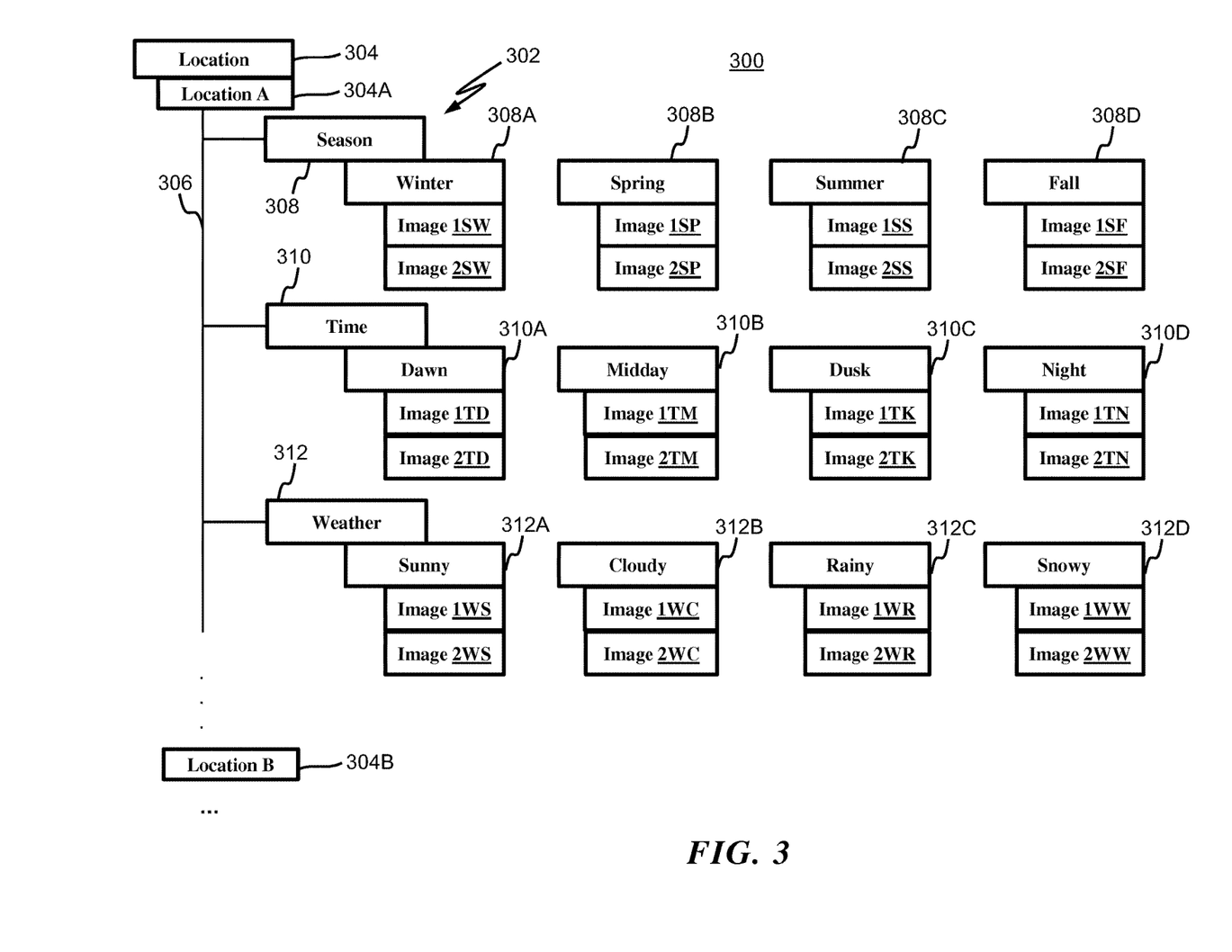
FIG. 3 illustrates an example data structure for context-based indexing.

FIG. 3 illustrates an example data structure 300 for context-based indexing according to an embodiment. The data structure 300 is one example of the database 212 of FIG. 2. In the example of FIG. 3, a number of contextual index values 302 define a number of contexts in which labeled reference images are organized. A location context 304 may be subdivided into image groups at different locations, such as location context 304A, location context 304B, and the like. A linking structure 306 may define a number of other context values associated with location context 304A. For instance, a scene or feature captured in image data at a geographic location associated with location context 304A can vary by a season context 308, a time of day context 310, a weather condition context 312, and other contexts (not depicted). Thus, image 1SW may represent a first scene with a winter context 308A, image 1SP may represent the first scene with a spring context 308B, image 1SS may represent the first scene with a summer context 308C, and image 1SF may represent the first scene with a fall context 308D. Lighting variations due to the time of day context 310 can be reflected in a dawn context 310A, a midday context 310B, a dusk context 310C, and a night context 310D. Corresponding time of day images for the first scene may be indexed as image 1TD, image 1TM, image 1TK, and image 1TN as illustrated in FIG. 3. Weather effects can be reflected as the weather condition context 312, for instance, in a sunny day context 312A, a cloudy day context 312B, a rainy day context 312C, and a snowy day context 312D. Corresponding weather condition images for the first scene may be indexed as image 1WS, image 1WC, image 1WR, and image 1WW as illustrated in FIG. 3.

Additional labeled reference images, such as an image set representative of a second scene can be similarly classified as the first scene. For instance, a second scene can be indexed by the season context 308 as images 2SW, 2SP, 2SS, and 2SF. The second scene can be indexed by the time of day context 310 as images 2TD, 2TM, 2TK, and 2TN. The second scene may also be indexed by the weather condition context 312 as images 2WS, 2WC, 2WR, and 2WW. Each of the images of FIG. 3 may be a scene that includes multiple semantic labels that identify segments in the scene by semantic type as labeled reference images. It will be appreciated that other organizations, contextual classifications, and a large number of scenes can be supported in embodiments. Furthermore, each image need not be isolated by a single context, as context values may be applied to images as tags or metadata such that a single image may have multiple context index tags reflecting a combination of the location context 304, season context 308, time of day context 310, weather condition context 312, and other context values (not depicted).

Figure 4:
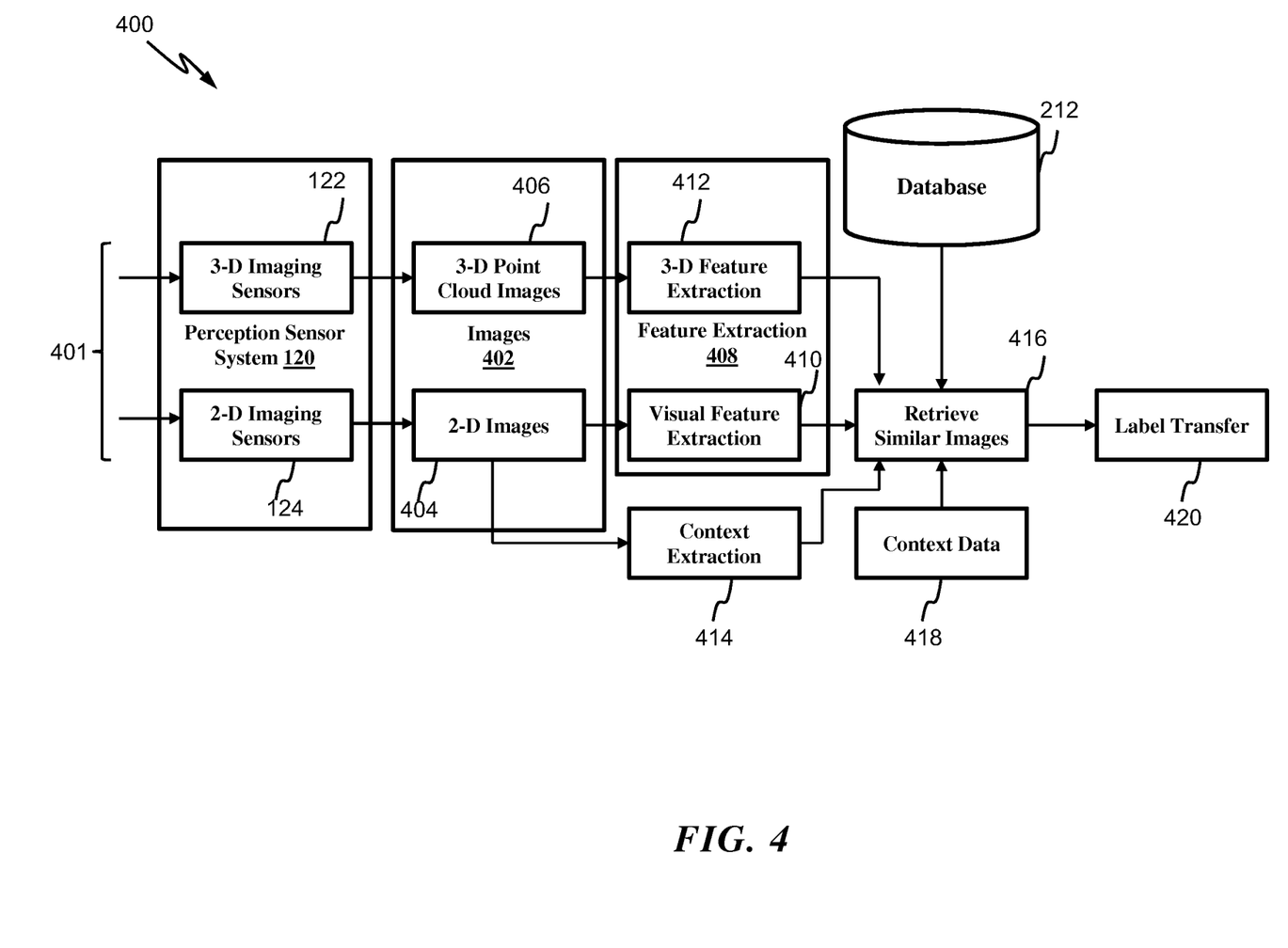
FIG. 4 illustrates a dataflow diagram for context-based autonomous perception according to an embodiment of the invention.

FIG. 4 illustrates an exemplary data flow diagram 400 that is performed by the processor 204 of FIG. 2 for implementing the context-based semantic image labeler 202 of FIG. 2 according to an embodiment. Perception sensor data 401 are acquired as one or more images 402 by the autonomous perception system 106 of FIG. 1, where the autonomous perception system 106 includes the processing system 118 of FIGS. 1 and 2 coupled to the perception sensor system 120. Multiple images 402 can be captured and processed as separate image instances, including two-dimensional visual images 404 and/or three-dimensional point cloud 406.

Feature extraction 408 can be performed by the autonomous perception system 106 of FIG. 1 on the images 402. The feature extraction 408 can identify one or more features in each of the images 402. Visual feature extraction 410 may be performed on the two-dimensional visual images 404 by the two-dimensional image processing system 128 of FIG. 1, while three-dimensional feature extraction 412 may be performed on the three-dimensional point cloud 406 by the three-dimensional image processing system 126 of FIG. 1. The feature extraction 408 may use known techniques to segment the two-dimensional visual images 404 and/or three-dimensional point cloud 406 as features to be evaluated. For example, homogeneous segments can be identified based on visual features and/or three-dimensional depth information. Color, texture, depth features, and the like can be used to identify candidate images or portions of images for further analysis. Various filters or transforms, such as a global GIST descriptor, a texton histogram, a local binary pattern (LBP), a Scale-Invariant Feature Transform (SIFT) descriptor, can be applied to detect and identify contrast, coarseness, directionality, periodicity or the like in the images 402. Other embodiments include implementing steerable filters, color moments, Differential Invariant Feature algorithms, Principal Components Analysis-SIFT or complex filters. Features from the images 402, such as color, texture, slope, and variance of planar fitting, can be provided to retrieve similar images logic 416.

Contextual information associated with one or more conditions present upon acquiring the perception sensor data 401 can be determined by the autonomous perception system 106 of FIG. 1. For example, context extraction 414 can be performed on the images 402, such as the two-dimensional visual images 404, based on metadata captured with the images 402. For instance, time of day and location information may be tagged in the images 402 as contextual information that can be extracted from metadata of the images 402. Any data that is directly extractable from the images 402 can be provided to the retrieve similar images logic 416 to assist in the searching the database 212. Other context data 418 can also be provided as contextual information to the retrieve similar images logic 416 from a variety of sources. For example, contextual information may be received at the autonomous perception system 106 of FIG. 1 as the context data 418 from one or more of: the navigation system 134 of FIGS. 1 and 2, the communication link 130 of FIGS. 1 and 2, and one or more of the input/output devices 210 of FIG. 2. As a further alternative, contextual information can be determined based on observing a test image by the autonomous perception system 106 of FIG. 1 and comparing the test image to a plurality of reference images having different context values in the database 212 to identify the contextual information based on one or more best matches between the test image and one of the reference images.

The retrieve similar images logic 416 can identify one or more labeled reference images, such as the images of FIG. 3, from the database 212 based on the contextual information and having a highest level of similarity with at least one of the one or more features extracted. The one or more labeled reference images may each include a scene with multiple semantic labels that identify segments in the scene by semantic type. Indexing of the database 212 may define a plurality of contexts including a season, a time of day, a weather condition, and a location. The highest level of similarity can be determined based on comparing the one or more features extracted to a plurality of labeled reference images in the database 212 having a contextual index value matching the contextual information and ranking results of the comparing. For example, if the context extraction 414 indicates a time/date stamp that is at midday in the summer, then the midday context 310B and summer context 308C of FIG. 3 may be searched for labeled reference images having a high degree of similarity with one or more features extracted from the images 402. Similarity can be determined using a known technique, such as SIFT analysis, between the images 402 and/or extracted features and the labeled reference images in the database 212.

Upon retrieving one or more labeled reference images from the database 212, a label transfer 420 can be performed. The label transfer 420 can parse an image of the images 402 into segments for labeling, e.g., based on the features extracted. The label transfer 420 can transfer one or more semantic labels from the one or more labeled reference images to the image to form a semantically labeled version of the image based on a Bayesian approach or a SIFT flow approach. As one, example, annotations of regions that are labeled in the one or more labeled reference images retrieved from the database 212 are transferred to an associated image of the images 402 using a known label transfer technique, such as dense scene alignment using a nearest neighbor matching and SIFT image ranking/voting. Three-dimensional data can be used to augment visual image data, with labels transferred onto a map or image. The autonomous perception system 106 of FIG. 1 can be incorporated in an autonomous vehicle, such as the autonomous UAV 100 of FIG. 1. The semantically labeled version of the image produced by the label transfer 420 may identify terrain conditions for guiding the autonomous UAV 100 of FIG. 1.

When using the three-dimensional imaging sensors 122 to acquire three-dimensional point cloud 406, the three-dimensional feature extraction 412 can be performed on the three-dimensional point cloud 406 in parallel with the visual feature extraction 410 on the two-dimensional visual images 404. One or more labeled reference images can be retrieved as a combination of semantically labelled two-dimensional and three-dimensional reference images for the label transfer 420.

Technical effects include supporting a wider range of environmental conditions having different reference images for context-based autonomous perception. By understanding the present context in which an autonomous vehicle is operating and using contextual information as an index into a database of labeled reference images, labeling of one or more captured images may achieve a higher degree of labeling accuracy, thus increasing confidence in autonomous decision making based on the labels, such as landing zone determination under a wide range of operating scenarios.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of performing context-based autonomous perception, the method comprising:
    acquiring perception sensor data as an image by an autonomous perception system, the autonomous perception system comprising a processing system coupled to a perception sensor system;
    performing feature extraction on the image by the autonomous perception system, the feature extraction identifying one or more features in the image;
    retrieving one or more semantically labeled reference images from a contextually-indexed database based on the contextual information and a feature-indexed database based on at least one of the one or more features extracted from the image;
    determining contextual information based on the one or more features extracted from the image associated with one or more conditions present upon acquiring the perception sensor data, the contextual information including one or more of a time of day, a season of the year, and weather conditions, wherein the contextual information is further determined by comparing a test image to a plurality of reference images having different context values in the contextually-indexed database; and
    parsing the image and transferring one or more semantic labels from the one or more labeled reference images to the image to form a semantically labeled version of the image.

2. The method of claim 1, wherein the image is a two-dimensional visual image, the method further comprising:
    acquiring a three-dimensional point cloud;
    performing three-dimensional feature extraction on the three-dimensional point cloud in parallel with the feature extraction on the two-dimensional visual image; and
    retrieving the one or more labeled reference images as a combination of semantically labelled two-dimensional and three-dimensional reference images for label transferring.

3. The method of claim 1, wherein additional contextual information is extracted from metadata of the image.

4. The method of claim 1, wherein the contextual information is received at the autonomous perception system from one or more of: a navigation system, a communication link, and an input/output device.

5. The method of claim 1, wherein a highest level of similarity is determined based on comparing the one or more features extracted from the image to a plurality of labeled reference images in the contextually-indexed database having a contextual index value matching the contextual information and ranking results of the comparing.

6. The method of claim 1, wherein the one or more labeled reference images each comprise a scene that includes multiple semantic labels that identify segments in the scene by semantic type.

7. The method of claim 1, wherein the perception sensor system comprises one or more of: a LIght Detection and Ranging scanners (LIDAR) scanner, a video camera, a multi-spectral camera, a stereo camera system, a structure light-based 3D/depth sensor, a time-of-flight camera, a LAser Detection and Ranging scanners (LADAR) scanner, and a Radio Detection And Ranging (RADAR) scanner.

8. The method of claim 1, wherein the autonomous perception system is incorporated in an autonomous vehicle, and the semantically labeled version of the image identifies terrain conditions for guiding the autonomous vehicle.

9. An autonomous perception system comprising:
    a perception sensor system; and
    a processing system coupled to the perception sensor system, the processing system comprising a processor and memory having instructions stored thereon that, when executed by the processor, cause the autonomous perception system to:
    acquire perception sensor data as an image from the perception sensor system;
    perform feature extraction on the image to identify one or more features in the image;

retrieve one or more labeled reference images from at least one of a contextually-indexed database based on the contextual information, a feature-indexed database based on at least one of the one or more features extracted from the image, and a combined contextually- and feature-indexed database;

determine contextual information including one or more of a season of the year, and weather conditions associated with one or more conditions present upon acquiring the perception sensor data based on the one or more features extracted from the image and by comparing a test image to a plurality of reference images having different context values in the contextually-indexed database; and parse the image and transfer one or more semantic labels that identify segments in the scene by semantic type from the one or more labeled reference images to corresponding segments in the image to form a semantically labeled version of the image.

10. The autonomous perception system of claim 9, wherein the image is a two-dimensional visual image, and the instructions, when executed by the processor, further cause the autonomous perception system to:

acquire a three-dimensional point cloud from the perception sensor system;

perform three-dimensional feature extraction on the three-dimensional point cloud in parallel with the feature extraction on the two-dimensional visual image; and retrieve the one or more labeled reference images as a combination of semantically labelled two-dimensional and three-dimensional reference images for label transferring.

11. The autonomous perception system of claim 9, wherein the contextual information is determined by one or more of:

extracting additional contextual information from metadata of the image; and receiving the contextual information at the autonomous perception system from one or more of: a navigation system, a communication link, and an input/output device.

12. The autonomous perception system of claim 9, wherein the one or more labeled reference images each comprise a scene that includes multiple semantic labels that identify segments in the scene by semantic type, and further wherein indexing of the contextually-indexed database defines a plurality of contexts including a season, a time of day, a weather condition, and a geographic location.

13. The autonomous perception system of claim 9, wherein the autonomous perception system is incorporated in an autonomous vehicle, and the semantically labeled version of the image identifies terrain conditions for guiding the autonomous vehicle.

* * * * *